Sept. 7, 1943.  N. G. A. MALMQUIST  2,328,660
RESILIENT WHEEL
Filed Oct. 14, 1941  2 Sheets—Sheet 1
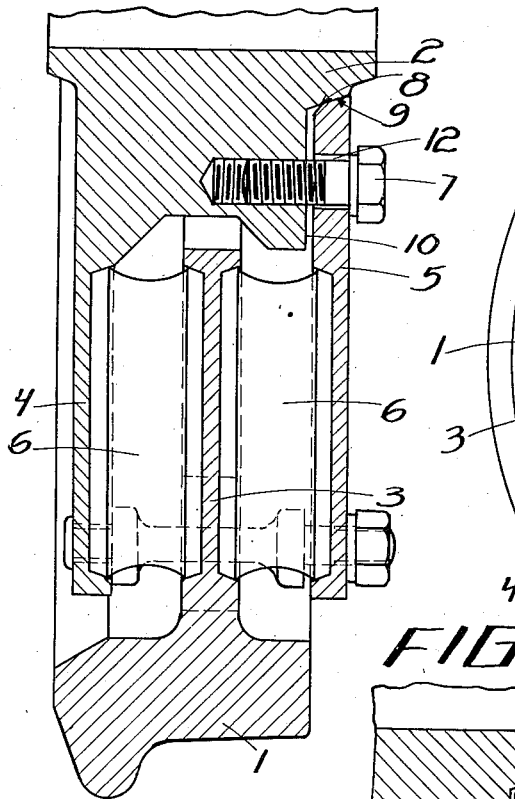
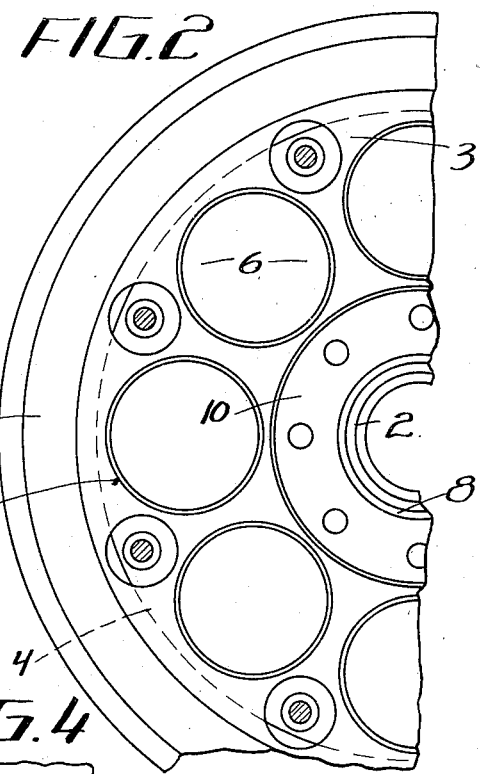
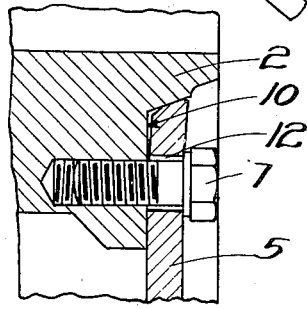
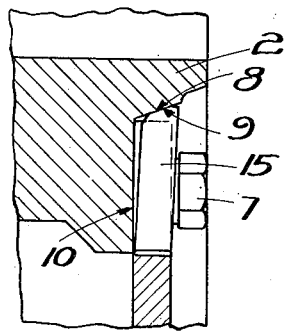
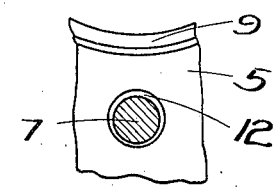
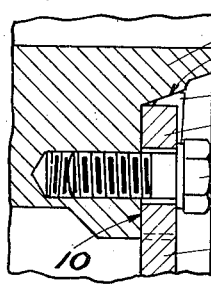
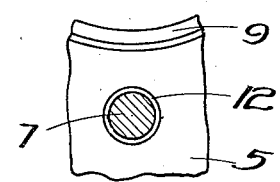

Patented Sept. 7, 1943

2,328,660

UNITED STATES PATENT OFFICE 2,328,660

RESILIENT WHEEL

Nils Gunnar August Malmquist, Malmo, Sweden, assignor to Svenska Aktiebolaget Bromsregulator, Malmö, Sweden, a corporation of Sweden Application October 14, 1941, Serial No. 414,960
In Sweden June 18, 1936

4 Claims. (Cl. 295—11)

On June 12, 1937, I filed an application for U. S. Letters Patent, given Ser. No. 147,977, and a continuation-in-part thereof was filed by me on May 10, 1938, and given Ser. No. 207,136. My present application is a continuation-in-part of my said prior applications Ser. Nos. 147,977 and 207,136 filed June 12, 1937, and May 10, 1938, respectively.

This invention relates to resilient wheels for use on railway vehicles, and more particularly to wheels of the type comprising a hub, a rim member, two outwardly directed radial flanges on said hub in axially spaced relation to each other, an intermediate radial flange on said rim member projecting inwardly between said outer flanges in axially spaced relation thereto, and a plurality of non-metallic flexible blocks, for instance of rubber, disposed under axial compression between said flanges for resiliently connecting the hub with the wheel rim. Such a wheel is described and shown in my U. S. Patent No. 2,086,720. As may be seen therefrom one of the outwardly directed flanges must be removably secured on the hub by means of bolts or screws for making possible assembling and dismantling of the wheel. In the construction of the wheel known from my said U. S. Patent No. 2,086,720 the removable flange is annular, and the hub is provided with an external circumferential seat for the internal periphery of the removable flange and, at the inner end of said seat, with a shoulder for the flange to bear against. At the assembling of the wheel the rubber blocks are put under a predetermined axial compression by the removable flange being drawn, by means of its attaching bolts or screws, axially home into firm bearing contact against the shoulder on the sub.

In a resilient wheel of this kind I have found it highly desirable that the removable outer flange shall have a firm bearing contact against the hub not only in the axial but at the same time also in the radial direction. Should the flange have a somewhat loose fit on the hub, the flange soon works still more loose in service and, furthermore, the attaching bolts or screws for the flange are subjected, during rotation of the wheel, to circulating shearing stresses, which results in a relatively rapid fatigue and breakdown of the bolts or screws. However, attempts to provide against ability of the flange to work loose in service by such a very accurate workmanship in the formation of the seat for the detachable flange on the hub and the internal periphery of the flange as ordinarily would be sufficient for securing a tight fit between them and still would allow for removal of the flange from the hub without too great difficulties when the wheel is to be dismantled for inspection or for renewal of worn-out rubber blocks or for other repair, were not very successful in practice for the reason that in railway practice the hub is generally secured to the axle by sweating the same thereon, and on sweating the wheel on the axle an unavoidable minute and indeterminate enlargement or expansion of the hub takes place. Thus, when the external seat on the hub and the internal periphery of the annular flange were made substantially cylindrical, as shown in my aforesaid U. S. Patent No. 2,086,720, and machined so accurately as to obtain a tight fit between them, the following difficulties were encountered. When the hub was sweated on the axle before assembling of the wheel, the sweating expansion of the hub was found to spoil the accuracy of the seat and in most cases made it impossible to put the flange in place on the hub. If the wheel was assembled and the flange put in place on the hub before sweating the hub on the axle, the sweating expansion of the hub in most cases results in jamming of the flange, so that the flange could not be removed thereafter from the hub for inspection or exchanges of worn-out or defective parts, or could be removed only with great difficulty. It might seem, from a theoretical point of view, that these difficulties could be avoided by postponing the accurate formation of the seat on the hub, or of the internal periphery of the flange, until the hub had been sweated on the axle and subjected to the expansion arising therefrom. This, however, would be no good practical solution of the problem because of the inconvenience in handling, during the formation of the seat, such an unwieldy work piece as one composed of a wheel axle having sweated thereon two hubs complete with their non-removable flanges, or alternatively in making the removable flange for each wheel in special to suit the hub of that very wheel. Moreover, such finishing machining would have to be executed in the railway workshop, instead of in the wheel factory. When, in an attempt to avoid the abovementioned jamming of the flange on the hub, the seat on the hub and the internal periphery of the annular flange were made conical, other difficulties were encountered. Certainly, due to the taper of the seat on the hub and the internal periphery of the flange, the flange could be removed from the hub after the sweating expansion thereof without too great difficulties, but it proved very difficult and expensive to secure, by accurate formation of the tapering surfaces on the hub and the flange, a close fit between these surfaces exactly in such an axial position of them in relation to each other in which the flange at the same time also had a firm bearing contact against the shoulder on the hub. Further, at re-assembling of the wheel after dismantling of the same and after the hub having been expanded by sweating the same on the wheel axle, the flange did not longer fit closely both radially against the seat and at the same time also axially against the shoulder on the hub. The lack of a firm bearing contact of the flange against the shoulder on the hub was found to allow for vibrations of the flange and the hub in relation to each other in service, and such vibrations caused ability of the attaching bolts for the flange, and thus also of the flange itself, to work loose in service.

The chief object of the invention is to provide a construction constituting a practical and entirely satisfactory solution of the problem of providing against the ability of the removable flange, or of its attaching bolts or screws, to work loose in service, without making it too difficult to remove the flange from the hub after the hub having been subjected to such an indeterminate expansion as may arise because of sweating the same on the wheel axle, or to put the flange in place again thereafter.

With this and other objects in view which will become apparent from the detailed description below the invention is more specifically dsecribed hereinbelow, claimed in the claims and shown in the drawings in which:

Fig. 1 is a partial section of a resilient wheel constructed in accordance with the invention, the removable hub flange being shown in a position from which it cannot be drawn axially home into bearing contact with the shoulder for the same on the hub without distortion of the flange.

Fig. 2 is partial lateral elevation of the wheel on a somewhat smaller scale and with the removable hub flange removed and certain parts shown in section.

Fig. 3 is a fractional lateral elevation of the removable hub flange and a cross section of one of its attaching bolts or screws, taken just inside of the flange in the position thereof shown in Fig. 1.

Fig. 4 is a fractional section of the hub and the removable flange thereon after the flange having been drawn axially home into firm bearing contact against the shoulder for the same on the hub.

Fig. 5 is a view similar to Fig. 3 of the removable hub flange and one of its attaching bolts, the flange, however, being in the position and condition shown in Fig. 4.

Figs. 7 and 8 are detail sections on the lines VII—VII and VIII—VIII, respectively, in Fig. 6.

Figure 6:
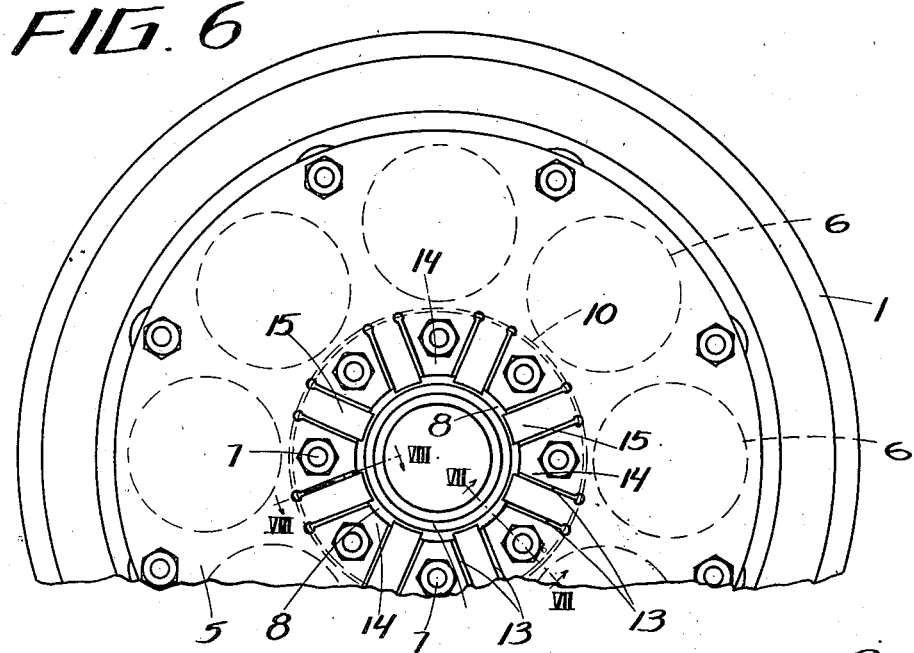
Fig. 6 is a partial lateral elevation of a wheel constructed according to a modification of the invention.

Referring to the drawings in which similar reference characters indicate like parts in the various views, 1 indicates the wheel rim and 2 indicates the hub. The rim has an inwardly directed flange 3 and the hub has two outwardly directed flanges 4 and 5 disposed on both sides of and axially spaced in relation thereto. Between the rim flange 3 and the hub flanges 4 and 5 are disposed rubber blocks 6 which are preferably of circular cross section and which have their ends seated in normally coaxial substantially shallow recesses in the facing sides of the flanges.

In order to permit the assembling and dismantling of the wheel one of the flanges on the hub 2 is made removable and is secured in position by means of bolts or screws 7. In the drawings the flange 5 is indicated as being removable.

The wheel is designed to be secured on the wheel axle by sweating the hub 2 thereon. Generally, for the sake of convenience, the hub is sweated on the wheel axle before the assembling of the wheel. Anyhow it must be possible to dismantle and re-assemble the wheel after the hub has been sweated on the wheel axle and thus permanently secured thereon.

For perfect operation and reliability of wheels of this kind it has been shown necessary to preclude any possibility of radial as well as axial movements or vibrations between the removable flange and the hub, which can be accomplished only if the flange is seated radially and axially very firmly on the hub. A firm bearing of the removable flange radially against the hub can be accomplished to reasonable costs only by making the flange annular and providing for a firm bearing contact of the internal periphery of the flange against an external circumferential seat on the hub. At a cursory glance it seemed obvious to make this seat, indicated at 8 in the drawings, and the conforming internal periphery 9 of the removable flange 5 conical as an aid in securing a firm bearing of the flange both axially and radially against the hub and yet an easy application and removal of the flange. However, in following up this thought in practice serious cruces appeared because of the fact that the flange necessarily must be given such an accurate predetermined axial position on the hub as is best obtained by providing the hub with such a shoulder as shown at 10 on the drawings and by making the construction such as to enable the flange to be drawn, by means of its attaching bolts or screws 7, axially home into a firm bearing contact with this shoulder 10, and further because of the fact that the hub is subjected to an indeterminate minor enlargement or expansion when sweating the same on the wheel axle. As is obvious to one skilled in the art great and costly precision work in the formation of the conical seat 8 on the hub and the internal periphery 9 of the flange would be necessary for ensuring a tight fit of the said periphery on the conical seat on the hub and simultaneously a firm bearing contact of the flange against the shoulder 10. But even if it would be possible to arrive at such a result by accurate workmanship the result thereof would be spoiled by the aforesaid indeterminate enlargement or expansion of the hub, so that the internal periphery of the flange would attain firm bearing contact both axially and radially against the seat 8 only on the hub and in a position still leaving a clearance between the flange and the shoulder 10 on the hub. Such a lack of a firm bearing contact of the flange against the shoulder on the hub proved to result in a relatively rapid loosening of the attaching bolts or screws 7 and thereby of the flange itself, obviously owing to the lack of the said firm bearing contact against the shoulder allowing for vibrations to take place between the flange and the hub. The flange once being somewhat loose, it soon works still more loose in service, and the bolts or screws 7 are subjected, during rotation of the wheel, to circulating shearing stresses resulting in a relatively rapid fatigue and break-down of the bolts or screws. Therefore, prior to the invention hereinafter described, I preferred to make the circumferential seat on the hub and the internal periphery of the flange substantially cylindrical, as shown in my U. S. Patent No. 2,086,720, because then I was sure of obtaining both the predetermined axial position of the flange on the hub and the desired firm bearing contact of the flange against the shoulder on the hub, thus restricting the trouble to that resulting from a somewhat loose fit of the flange radially only against the hub, or to that resulting from difficulties in application and removal of the flange.

By the present invention I not only eliminate all the troubles above referred to but also save the advantages which a conical formation of the external seat on the hub and of the internal periphery of the flange has as an aid in ensuring an easy application and removal of the flange. To this end and in accordance with the invention I make the removable flange from a material that is both tenacious and elastic to an appreciable degree, such as steel plate, and of a moderate thickness and of such dimensions regarding the internal periphery of the flange in relation to the external seat on the hub as are illustrated in Fig. 1 wherein the external seat 8 on the hub and the internal periphery 9 of the removable flange 5 are cone-shaped and of an inclination relatively to the axis of the wheel that is at least as great as, and preferably greater than, the angle of friction between them, and wherein the diameter of the cone-shaped internal periphery 9 at the inner end thereof is not only appreciably greater than the diameter of the external cone-shaped seat 8 on the hub at the outer end thereof but also appreciably smaller than the diameter of the said seat 8 at the inner end thereof. In other words, the construction is such that the flange 5 is prevented from being drawn axially home into the desired firm bearing contact against the shoulder 10 without appreciable distortion of the flange, and that this result is obtained irrespective of such an indeterminate minor enlargement or expansion of the hub as is caused by sweating the hub on the wheel axle. Further the construction is such as to permit the flange to be drawn, by means of the bolts or screws 7, home into firm bearing contact against the shoulder 10 under appreciable distortion of the flange, as shown in Fig. 4. In the form of the invention illustrated in Figs. 1 to 5 this distortion of the flange consists partly in a relative axial displacement of the material of the flange adjacent to the central opening thereof, and partly in a relative radial displacement or expansion of the material of the flange in a zone thereof extending radially an indeterminate distance from the central opening of the flange and including the region of the holes 12 in the flange for the attaching bolts or screws 7. This radial displacement or expansion of the material of the flange in the said zone thereof is of such an order that, on account of the same and according to the invention, special provision must be made against the flange jamming itself radially against the bolts or screws 7, and against one or more of the bolts or screws 7 possibly being sheared off or damaged by the flange on drawing the flange home into the desired firm bearing contact against the shoulder 10 on the hub. Thus, as best shown in Figs. 3 and 5, I provide the flange 5 with a sufficient clearance for each bolt or screw 7 to allow for the radial expansion of the flange in the aforesaid zone thereof without any risk for the flange jamming itself radially against the bolts or screws 7, or for any one of the bolts or screws 7 being subjected to any undesirable shearing stress by the flange. According to the form shown this necessary clearance is provided for by initially placing the holes 12 in the flange, now supposing the flange to be centered in relation to the hub, somewhat eccentrically in relation to the respective bolts or screws 7, or the holes for them in the shoulder 10, and by making the holes 12 of a somewhat greater diameter in relation to the diameter of the bolts or screws 7 than ordinarily would be used, so that the expansion of the flange acts in the direction of centering the holes 12 in relation to the bolts or screws 7, and so that a practically perfect security is obtained for there being no possibility for the flange to stress the bolts in shear either on drawing the flange home or in service thereafter.

In the modified form of the invention illustrated in Figs. 6 to 8 the zone of the removable flange 5 extending radially from the central opening thereof a distance somewhat beyond the holes 12 for the bolts or screws 7 is divided by nearly radial cuts or slots 13 into alternating shorter and longer tongues 14 and 15, respectively, the holes 12 for the bolts or screws 7 being provided in the shorter tongues 14. In this form of the invention the cone-shaped seating surface 9 on the flange is discontinuous and formed only on the longer tongues 15, and the distortion of the flange on drawing the same home into the desired firm bearing contact against the shoulder 10 on the hub substantially concentrates itself to the longer tongues 15 by these tongues being displaced or bent axially in relation to the shorter tongues 14, as shown in Figs. 7 and 8.

Figure 9:
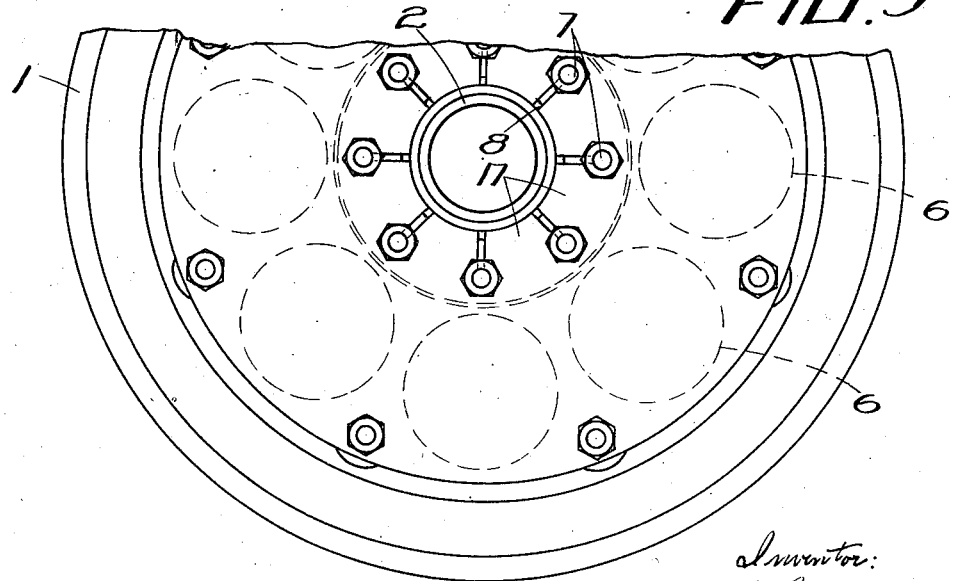
Fig. 9 is a partial lateral view of a wheel constructed according to a further modification of the invention.

In the further modified form of the invention illustrated in Fig. 9 the removable flange 5 is provided with radial cuts or slots 16 extending from the central opening of the flange to the holes provided therein for the attaching bolts or screws 7, whereby the zone of the flange between the central opening thereof and the holes for the bolts or screws 7 is divided into equally long tongues 17 to which the distortion to which the flange is subjected on drawing the same home into the desired firm bearing contact against the shoulder 10 on the hub substantially concentrates itself by the said tongues being displaced or bent axially similarly to the tongues 15 in the form of the invention illustrated in Figs. 6 to 8. Of course the cone-shaped seating surface on the internal periphery of the flange is formed on the ends of the tongues 17 and thus discontinued by the cuts or slots 16 between the tongues.

In the forms of the invention illustrated in Figs. 6 to 9 the radial displacement or expansion of the material of the flange in the region of the holes for the attaching bolts or screws 7 will not be so great as in the form of Figs. 1 to 5, or there will be practically no such radial displacement or expansion as would necessitate such a special provision to allow for the same as that illustrated by Figs. 3 and 5 in connection with the form of Figs. 1 to 5.

Practical experiments have shown that the distortion or change in form which the removable flange 5 is subjected to on drawing the same home into the desired firm bearing contact against the shoulder 10 on the hub is, to a substantial part at least, an elastic one, so that the wheel can be repeatedly dis- and re-assembled and the firm bearing contact of the flange both radially against the circumferential seat on the hub and axially against the shoulder on the hub retained, even if further plastic changes in form take place during subsequent service of the wheel.

What I claim and desire to secure by Letters Patent is:

1. In a resilient wheel of the character described, comprising in combination, a hub, two outwardly directed flanges on said hub, a rim having an inwardly directed flange disposed between said hub flanges and axially spaced in relation thereto, non-metallic flexible blocks disposed under a predetermined axial compression between said flanges for resiliently connecting said rim flange to said hub flanges, one of said hub flanges being annular and removably mounted on said hub, a cone-shaped circumferential seat on said hub for the internal periphery of said removable flange, a shoulder on said hub at the inner end of said seat, and means for drawing and holding said removable flange axially against said shoulder on said hub, said removable flange being provided with slots extending a distance into the flange from the central opening thereof and dividing the region of the flange next to said central opening into a number of tongues, and said removable flange being made from a tenacious material and so constructed and dimensioned as to prevent it from being drawn axially home into firm bearing contact against said shoulder on said hub without appreciable distortion of said slotted region of the flange, and to make possible such distortion of said region by the flange being drawn by said means axially home into firm bearing contact against said shoulder on said hub.

2. In a resilient wheel of the character described, comprising a hub, two outwardly directed axially spaced flanges on said hub, a rim having an inwardly directed flange disposed between said hub flanges and axially spaced in relation thereto, non-metallic flexible blocks disposed under a predetermined axial compression between said flanges for resiliently connecting said rim flange to said hub flanges, one of said hub flanges being annular and removably mounted on said hub, a circumferential seat on said hub for the internal periphery of said removable flange, a shoulder on said hub at the inner end of said seat, and bolts for drawing and holding said removable flange axially against said shoulder, said shoulder and said removable flange being provided with axial holes for said bolts, said seat on said hub and said interior periphery of said removable flange both being cone-shaped and of an inclination relatively to the axis of the wheel that is at least as great as the angle of friction between them, the diameter of said cone-shaped interior periphery at the inner end thereof being not only greater than the diameter of said circumferential seat at the outer end thereof but also so much smaller than the diameter of said seat at the inner end thereof that said removable flange is prevented from being drawn axially home into firm bearing contact against said shoulder without appreciable distortion of said removable flange, and said removable flange being made from a tenacious material and so constructed as to enable the same to be so distorted without jamming the same against said bolts by drawing said removable flange axially home into firm bearing contact against said shoulder on said hub by means of said bolts, said removable flange being provided with slots extending a distance into the flange from the central opening thereof and dividing the zone of the flange next to the said opening into tongues on which the cone-shaped interior periphery of the flange is formed.

3. In a resilient wheel of the character described, comprising a hub, two outwardly directed axially spaced flanges on said hub, a rim having an inwardly directed flange disposed between said hub flanges and axially spaced in relation thereto, non-metallic flexible blocks disposed under a predetermined axial compression between said flanges for resiliently connecting said rim flange to said hub flanges, one of said hub flanges being annular and removably mounted on said hub, a circumferential seat on said hub for the internal periphery of said removable flange, a shoulder on said hub at the inner end of said seat, and bolts for drawing and holding said removable flange axially against said shoulder, said shoulder and said removable flange being provided with axial holes for said bolts, said seat on said hub and said interior periphery of said removable flange both being cone-shaped and of an inclination relatively to the axis of the wheel that is at least as great as the angle of friction between them, the diameter of said cone-shaped interior periphery at the inner end thereof being not only greater than the diameter of said circumferential seat at the outer end thereof but also so much smaller than the diameter of said seat at the inner end thereof that said removable flange is prevented from being drawn axially home into firm bearing contact against said shoulder without appreciable distortion of said removable flange, and said removable flange being made from a tenacious material and so constructed as to enable the same to be so distorted without jamming the same against said bolts by drawing said removable flange axially home into firm bearing contact against said shoulder on said hub by means of said bolts, said removable flange being provided with slots extending into the flange from the central opening thereof a distance beyond the region of said holes and dividing the zone of the flange next to the said opening into alternately longer and shorter tongues, the holes for the bolts being arranged in the shorter tongues, and the cone-shaped interior periphery of the flange being formed on the longer tongues.

4. In a resilient wheel of the character described, comprising a hub, two outwardly directed axially spaced flanges on said hub, a rim having an inwardly directed flange disposed between said hub flanges and axially spaced in relation thereto, non-metallic flexible blocks disposed under a predetermined axial compression between said flanges for resiliently connecting said rim flange to said hub flanges, one of said hub flanges being annular and removably mounted on said hub, a circumferential seat on said hub for the internal periphery of said removable flange, a shoulder on said hub at the inner end of said seat, and bolts for drawing and holding said removable flange axially against said shoulder, said shoulder and said removable flange being provided with axial holes for said bolts, said seat on said hub and said interior periphery of said removable flange both being cone-shaped and of an inclination relatively to the axis of the wheel that is at least as great as the angle of friction between them, the diameter of said cone-shaped interior periphery at the inner end thereof being not only greater than the diameter of said circumferential seat at the outer end thereof but also so much smaller than the diameter of said seat at the inner end thereof that said removable flange is prevented from being drawn axially home into firm bearing contact against said shoulder without appreciable distortion of said removable flange, and said removable flange being made from a tenacious material and so constructed as to enable the same to be so distorted without jamming the same against said bolts by drawing said removable flange axially home into firm bearing contact against said shoulder on said hub by means of said bolts, said removable flange being provided with slots extending from the cone-shaped interior periphery of the flange to the holes therein for the bolts.

NILS GUNNAR AUGUST MALMQUIST.